United States Patent
Tanaka et al.

(10) Patent No.: US 9,689,476 B2
(45) Date of Patent: Jun. 27, 2017

(54) CONTINUOUSLY VARIABLE TRANSMISSION AND CONTROL METHOD OF CONTINUOUSLY VARIABLE TRANSMISSION

(71) Applicant: JATCO Ltd, Fuji-shi, Shizuoka (JP)

(72) Inventors: Hiroaki Tanaka, Yokohama (JP); Takeo Yoshida, Fujinomiya (JP); Makoto Oguri, Ayase (JP)

(73) Assignee: JATCO Ltd, Fuji-Shi (JP)

( * ) Notice: Subject to any disclaimer, the term of this patent is extended or adjusted under 35 U.S.C. 154(b) by 0 days.

(21) Appl. No.: 15/021,259

(22) PCT Filed: Oct. 17, 2014

(86) PCT No.: PCT/JP2014/077729
§ 371 (c)(1),
(2) Date: Mar. 10, 2016

(87) PCT Pub. No.: WO2015/060219
PCT Pub. Date: Apr. 30, 2015

(65) Prior Publication Data
US 2016/0223056 A1  Aug. 4, 2016

(30) Foreign Application Priority Data

Oct. 23, 2013 (JP) .................................. 2013-220318

(51) Int. Cl.
| | |
|---|---|
| *F16H 9/18* | (2006.01) |
| *F16H 61/662* | (2006.01) |
| *F16H 63/06* | (2006.01) |
| *F02B 63/04* | (2006.01) |
| *B60L 11/02* | (2006.01) |

(52) U.S. Cl.
CPC ............. *F16H 9/18* (2013.01); *F16H 61/662* (2013.01); *F16H 63/062* (2013.01); *B60L 11/02* (2013.01); *F02B 63/04* (2013.01); *Y02T 10/76* (2013.01)

(58) Field of Classification Search
CPC ........................................................ F16H 9/18
See application file for complete search history.

(56) References Cited

U.S. PATENT DOCUMENTS

| | | | | |
|---|---|---|---|---|
| 4,060,012 A | * | 11/1977 | Giacosa | B60K 17/08 475/204 |
| 2005/0109554 A1 | * | 5/2005 | Ishikawa | F16H 9/18 180/312 |
| 2011/0143872 A1 | * | 6/2011 | Chen | F16H 55/56 474/23 |
| 2012/0100944 A1 | * | 4/2012 | Gu | F16H 9/18 474/46 |

FOREIGN PATENT DOCUMENTS

JP   2001-349401 A   12/2001

* cited by examiner

*Primary Examiner* — Derek D Knight
(74) *Attorney, Agent, or Firm* — Foley & Lardner LLP

(57) ABSTRACT

A fixed conical plate that is fixed to a rotation shaft, a movable conical plate that moves in the axial direction of the rotation shaft with respect to the fixed conical plate, a slide mechanism that moves the movable conical plate, and a controller that controls the state of the slide mechanism are provided. The controller changes the groove width of a second pulley by driving a motor generator, while a first clutch is engaged, and thus moving the movable conical plate, and drives the motor generator as a generator by the rotation of the rotation shaft, by engaging a second clutch.

8 Claims, 5 Drawing Sheets

| | STATE OF ACCELERATOR PEDAL | ROTATION DIRECTION OF INPUT SHAFT | DIRECTION OF SHIFT | OPERATION OF MOTOR | ROTATION DIRECTION OF MOTOR | STATE OF CLUTCH CL1 | STATE OF CLUTCH CL2 |
|---|---|---|---|---|---|---|---|
| MODE1 | ON | FORWARD ROTATION | Lo→Hi | SHIFT | REVERSE ROTATION | ON | OFF |
| MODE2 | ON | FORWARD ROTATION | Hi→Lo | SHIFT | FORWARD ROTATION | ON | OFF |
| MODE3 | OFF | FORWARD ROTATION | Lo→Hi | SHIFT | REVERSE ROTATION | ON | OFF |
| MODE4 | OFF | FORWARD ROTATION | Hi→Lo | SHIFT | FORWARD ROTATION | ON | OFF |
| MODE5 | OFF | FORWARD ROTATION | FIXED | REGENERATION | FORWARD ROTATION | OFF | ON |
| MODE6 | OFF | FORWARD ROTATION | Hi→Lo | SHIFT + REGENERATION | FORWARD ROTATION | ON→OFF | OFF→ON |
| MODE7 | ON | FORWARD ROTATION | FIXED | POWER RUNNING | FORWARD ROTATION | OFF | ON |

FIG. 2

CONTINUOUSLY VARIABLE TRANSMISSION AND CONTROL METHOD OF CONTINUOUSLY VARIABLE TRANSMISSION

TECHNICAL FIELD

The present invention relates to a continuously variable transmission that electrically drives a movable pulley, and a control method of the same.

BACKGROUND ART

A conventional belt continuously variable transmission includes an endless belt or chain extending between V-grooves of a first pulley and a second pulley, and performs shift by changing widths of the V-grooves. These pulleys are driven by hydraulic pressure generated by a hydraulic pump, in order to maintain thrust for transmitting a rotation torque while sandwiching the belt.

Meanwhile, friction of the hydraulic pump becomes a load for a driving power source, resulting in deterioration of fuel efficiency of the driving power source.

In response to this, JP2001-349401A discloses such a control mechanism of a continuously variable transmission that is provided with slide driving means for sliding a movable disc in the axial direction by a motor for driving the movable disc and rotation of the motor.

SUMMARY OF INVENTION

According to the conventional art as described in JP2001-349401A, a hydraulic mechanism is replaced by the motor, so as to reduce space near a rotation shaft, and to achieve a compact configuration. However, the weight of the motor is added, and a generator and a battery for driving the motor are required, as a result of which the fuel efficiency is not necessarily improved.

The technology as described in JP2001-349401A is particularly made based on the assumption that it is used for relatively small-sized vehicles, such as two-wheeled vehicles. When such technology is applied to heavy vehicles requiring a large torque, such as automobiles, the weight may be increased by the motor and the battery, and the fuel efficiency may be deteriorated.

The present invention is made in view of the above-described problems, and its object is to provide a continuously variable transmission that electrically drives the movable conical plate and that can improve the fuel efficiency.

According to an aspect of the present invention, a continuously variable transmission is provided which comprises a first pulley and a second pulley capable of changing groove widths; and a belt, extended between the first pulley and the second pulley, for transmitting rotation, wherein shift is performed by changing the groove widths of the first pulley and the second pulley. The second pulley comprises a fixed conical plate fixed to a rotation shaft, a movable conical plate moving in an axial direction of the rotation shaft with respect to the fixed conical plate, a slide mechanism moving the movable conical plate, and a controller controlling a state of the slide mechanism. The slide mechanism comprises a piston causing the movable conical plate to advance/retreat, a motor generator moving the piston in the axial direction, a planetary gear mechanism interposed between the motor generator and the piston, a first clutch making rotation between the motor generator and the planetary gear mechanism discontinuous/continuous, and a second clutch making rotation between the rotation shaft and the motor generator discontinuous/continuous. The controller changes the groove width of the second pulley by driving the motor generator, while the first clutch is engaged, and thus moving the movable conical plate, and drives the motor generator as a generator by the rotation of the rotation shaft, by engaging the second clutch.

BRIEF DESCRIPTION OF DRAWINGS

FIG. 2 is an explanatory view illustrating the state of a secondary pulley according to the first embodiment of the present invention;

DESCRIPTION OF EMBODIMENTS

Hereinafter, embodiments of the present invention will be explained with reference to the drawings.

Figure 1:
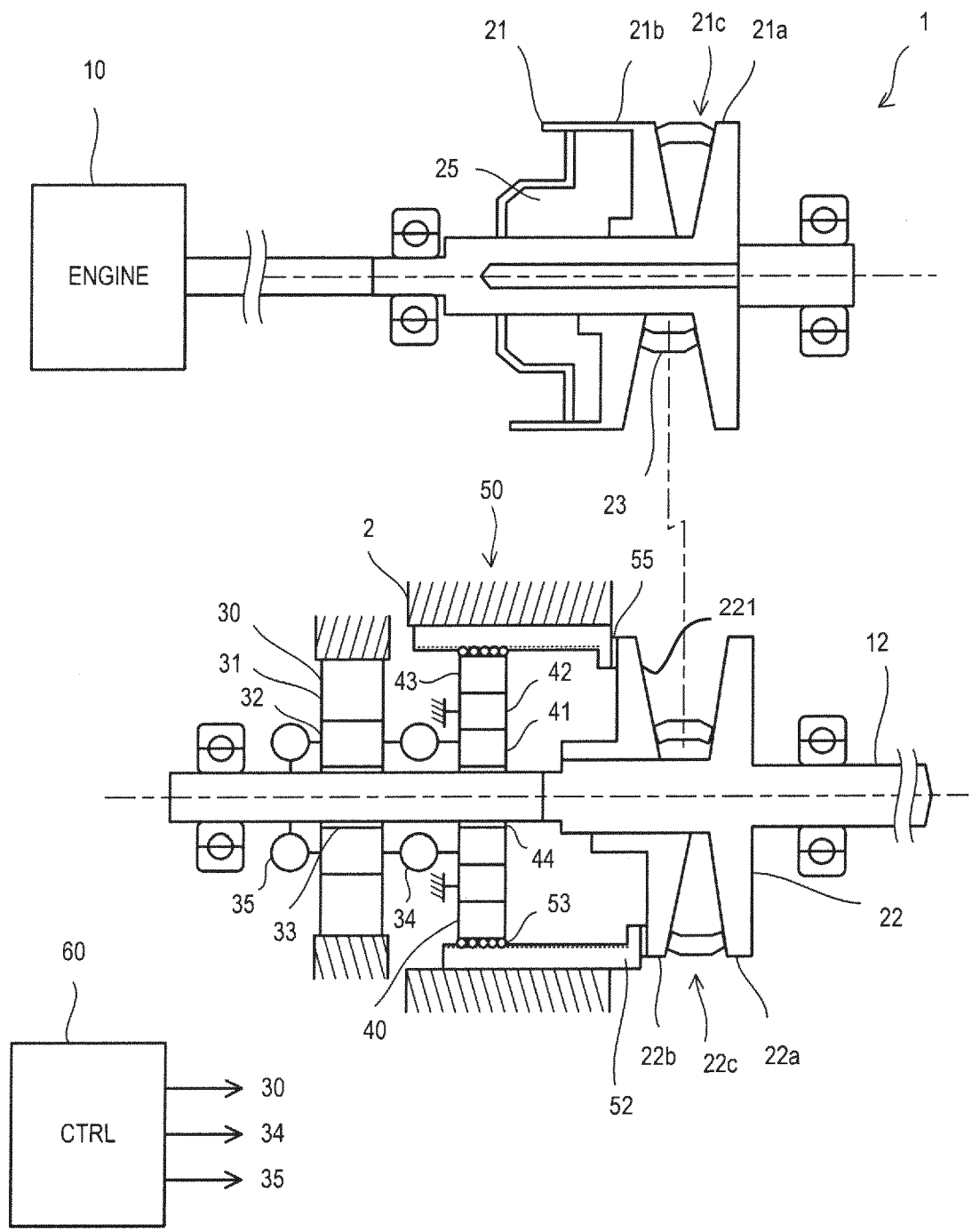
FIG. 1 is an explanatory view illustrating the structure of a continuously variable transmission 1 according to a first embodiment of the present invention.

FIG. 1 is an explanatory view illustrating the structure of a continuously variable transmission 1 according to a first embodiment of the present invention.

The continuously variable transmission 1 according to this embodiment is mounted on a vehicle, and drives the vehicle by changing the speed of rotation of an engine 10 as a driving source and outputting it.

The continuously variable transmission 1 is formed by a primary pulley 21, a secondary pulley 22, and a V-belt 23. The rotation from the engine 10, as a driving power source, is inputted to a rotation shaft (primary shaft) 11 of the primary pulley 21. Rotation outputted from a rotation shaft (secondary shaft) 12 of the secondary pulley 22 rotates not-illustrated driving wheels and drives the vehicle.

The V-belt 23 is extended between a V-groove 21c that is formed by a fixed conical plate 21a and a movable conical plate 21b of the primary pulley 21, and a V-groove 22c that is formed by a fixed conical plate 22a and a movable conical plate 22b of the secondary pulley 22.

By changing groove widths of the V-grooves 21c and 22c, respectively, the speed of rotation that is inputted from the primary shaft 11 is changed and outputted from the secondary shaft 12. The shift is performed in this manner. In FIG. 1, the upper side from the dashed line illustrates the case where a speed ratio (pulley ratio) is on a Lo side, and the lower side illustrates the case where the speed ratio is on a Hi side.

The primary pulley 21 is provided with a hydraulic chamber 25. By changing hydraulic pressure to be supplied to the hydraulic chamber, the movable conical plate 21b is advanced/retreated so as to change the groove width of the V-groove 21c.

The secondary pulley 22 is formed by the fixed conical plate 22a that is coupled to the secondary shaft 12 and rotated integrally with the secondary shaft 12, and the movable conical plate 22b that is fitted to the secondary shaft 12 to be able to slide in the axial direction of the secondary shaft 12. The movable conical plate 22b is provided with a slide mechanism 50. The slide mechanism 50 changes the groove width of the V-groove 22c of the secondary pulley 22 when a controller 60 drives a motor generator 30 to advance/retreat the movable conical plate 22b, as will be described later.

The slide mechanism 50 is formed by the motor generator 30, a planetary gear mechanism 40, a slide piston 52, several clutches and the like.

The motor generator 30 is rotatably provided on the outer periphery of the secondary shaft 12 via a bearing 33. A stator 31 of the motor generator 30 is fixed to a case 2. A rotor 32 that is fitted inside the stator 31 is rotatably provided on the secondary shaft 12 via the bearing 33. The rotor 32 is connected to a sun gear 41 of the planetary gear mechanism 40 via a first clutch 34, and is formed in such a manner that rotation between the rotor 32 and the sun gear 41 is made discontinuous/continuous. The rotor 32 is also connected to the secondary shaft 12 via a second clutch 35, and is formed in such a manner that rotation between the rotor 32 and the secondary shaft 12 is made discontinuous/continuous.

Each of the first clutch 34 and the second clutch 35, whose engaging power is controlled by an electromagnetic solenoid, for example, is controlled by the controller 60 to become an engaging state, a releasing state, and a slipping state with which rotation is transmitted with differential rotation between input rotation speed and output rotation speed. The engaging power of the first clutch 34 and the second clutch 35 may be controlled by hydraulic pressure.

The planetary gear mechanism 40 is formed by the sun gear 41, pinions 42, and a ring gear 43. The inner periphery of the sun gear 41 is rotatably fitted on the secondary shaft 12 via a bearing 44. A carrier that connects the pinions 42 is fixed to the case 2, and the planetary gear mechanism 40 decelerates rotation of the sun gear 41 and transmits it to the ring gear 43. The slide piston 52 is provided on the outer periphery side of the ring gear 43.

A ball screw 53 is interposed between the ring gear 43 and the slide piston 52 so that the slide piston 52 makes forward/backward movement in the axial direction of the secondary shaft 12 by rotation of the ring gear 43. The ball screw 53 causes the slide piston 52 to make the forward/backward movement by rotation of the planetary gear mechanism 40, but an angle of repose is set in such a manner that the planetary gear mechanism 40 does not rotate depending on the power of the slide piston 52 in the axial direction. Thus, the slide piston 52 does not move depending on thrust of the secondary pulley 22.

The slide piston 52 is spline-fitted to the case 2, and is formed to make the forward/backward movement by the planetary gear mechanism 40, as described above. The slide piston 52 has a cylindrical shape that is coaxial with the secondary shaft 12, and, at the end part of its cylindrical shape, abuts against the end part side 221, in the radial direction, of the movable conical plate 22b of the secondary pulley 22, via a bearing 55.

The controller 60 changes the groove width of the V-groove 22c of the secondary pulley 22, by controlling driving of the motor generator 30 and engagement and release of the first clutch 34 and the second clutch 35. The controller 60 controls the groove width of the V-groove 22c of the secondary pulley 22 in response to the groove width of the V-groove 21c of the primary pulley 21, so as to control the speed ratio of the continuously variable transmission 1.

The operation of thus-structured continuously variable transmission 1 according to the first embodiment will be explained.

The continuously variable transmission 1 according to this embodiment is a combination of the conventionally-known primary pulley 21 that changes the groove width by moving the movable conical plate 21b by the hydraulic pressure, and the secondary pulley 22 that changes the groove width by moving the movable conical plate 22b by driving the motor generator 30.

The controller 60 decides a target value of the speed ratio based on the vehicle speed, an acceleration/deceleration request, engine rotation speed and the like, and decides indicated oil pressure to the primary pulley 21 so that an actual speed ratio of the continuously variable transmission 1 follows the target value. Based on the indicated oil pressure, the hydraulic pressure is supplied to the hydraulic chamber 25 of the primary pulley 21, the movable conical plate 21b advances/retreats, and the groove width is changed.

According to the change in the groove width of the primary pulley 21, the controller 60 causes the first clutch 34 and the second clutch 35 to be in the engaging state and in the releasing state, respectively, makes the motor generator 30 to perform power running, and causes the movable conical plate 22b of the secondary pulley 22 to advance/retreat. Thus, the groove width of the V-groove 22c of the secondary pulley 22 is changed in response to the movement of the primary pulley 21.

With the structure like this according to this embodiment, the hydraulic mechanism is used only on the primary pulley 21 side, and thus the hydraulic pressure, required for shift, can be reduced, the friction of the hydraulic pump can be reduced, and the fuel efficiency can be improved.

Further, the controller 60 drives the motor generator 30 by the rotation of the secondary shaft 12 of the secondary pulley 22, and regenerates rotational energy as power. The regenerated power is charged to a battery or the like. The details will be explained below.

When the vehicle is decelerating and when the speed ratio of the continuously variable transmission 1 is not changed, the controller 60 causes the first clutch 34 to be in the releasing state and the second clutch 35 to be in the engaging state. Thereby, the rotor 32 of the motor generator 30 rotates together with the secondary shaft 12. The controller 60 causes the motor generator 30 to function as a generator, so as to regenerate the rotational energy of the secondary shaft 12 as power. The regenerated power is charged to the battery or the like by the controller 60.

When the vehicle is required to accelerate at this time, the controller 60 causes the motor generator 30 to function as a motor. Thereby, the rotor 32 of the motor generator 30 rotates, and the rotation is transmitted via the second clutch 35 to the secondary shaft 12. Thus, an assist can be provided to driving power of the driving power source that applies rotation to the secondary pulley 22. As the power to drive the motor generator 30 is obtained by the regeneration, the energy efficiency of the driving power source can be improved.

FIG. 2 is an explanatory view illustrating the state of the secondary pulley 22 according to this embodiment.

FIG. 2 illustrates the state of an accelerator pedal, the rotation direction of the primary shaft 11, the direction of the shift, the operation state of the motor generator 30, the rotation direction of the motor generator 30, and the states of the first clutch 34 and the second clutch 35, respectively.

When a driver depresses the accelerator pedal (accelerator is ON) and when the speed ratio is shifted from the Lo side to the Hi side, the controller 60 causes the first clutch 34 to be in the engaging state (ON), and the second clutch 35 to be in the releasing state (OFF), and makes shift operation of the motor generator 30 in the direction of reverse rotation.

Thereby, the groove width of the secondary pulley 22 is changed in response to the operation of the primary pulley 21, and the speed ratio is shifted from the Lo side to the Hi side (mode 1).

Similarly, when the accelerator is ON and when the speed ratio is shifted from the Hi side to the Lo side, the controller 60 causes the first clutch 34 to be ON and the second clutch 35 to be OFF, and makes the shift operation of the motor generator 30 in the direction of forward rotation. Thereby, the groove width of the secondary pulley 22 is changed in response to the operation of the primary pulley 21, and the speed ratio is shifted from the Hi side to the Lo side (mode 2).

When the driver does not depress the accelerator pedal (accelerator is OFF) and when the speed ratio is shifted from the Lo side to the Hi side, the controller 60 causes the first clutch 34 to be ON and the second clutch 35 to be OFF, and makes the shift operation of the motor generator 30 in the direction of the reverse rotation. Thereby, the groove width of the secondary pulley 22 is changed in response to the operation of the primary pulley 21, and the speed ratio is shifted from the Lo side to the Hi side (mode 3).

Similarly, when the accelerator is OFF and when the speed ratio is shifted from the Hi side to the Lo side, the controller 60 causes the first clutch 34 to be ON and the second clutch 35 to be OFF, and makes the shift operation of the motor generator 30 in the direction of the forward rotation. Thereby, the groove width of the secondary pulley 22 is changed in response to the operation of the primary pulley 21, and the speed ratio is shifted from the Hi side to the Lo side (mode 4).

When the accelerator is OFF and when the speed ratio is not changed (when the speed ratio is fixed), the controller 60 causes the first clutch 34 to be OFF and the second clutch 35 to be ON, causes the motor generator 30 to function as the generator, and makes regeneration operation in the direction of the forward rotation. Thereby, power is generated as the rotation of the secondary shaft 12 is transmitted to the motor generator 30, and the rotational energy is regenerated as power (mode 5).

When the accelerator is OFF and when the mode is changed from the mode 3 or the mode 4 to the mode 5, by which the regeneration operation of the motor generator 30 is made, the controller 60 controls the first clutch 34 to become OFF from ON, and the second clutch 35 to become ON from OFF, respectively, and starts the regeneration by the motor generator 30. This operation will be described in detail with reference to FIG. 3 (mode 6).

Further, when the driver depresses the accelerator and when the speed ratio is not changed, the controller 60 causes the first clutch 34 to be OFF and the second clutch 35 to be ON, and drives the motor generator 30 in the direction of the forward rotation. Thereby, the rotation of the motor generator 30 is transmitted to the secondary shaft 12, and an assist can be provided to the driving power of the vehicle (mode 7).

As the controller 60 controls the first clutch 34, the second clutch 35, and the motor generator 30 based on the state of the accelerator pedal, as described above, it is possible to control the speed ratio and to regenerate the rotational energy as power.

Next, the control of the above-described mode 6 in FIG. 2 will be explained.

When the driver releases the depression of the accelerator pedal and the accelerator becomes OFF, during when the vehicle is travelling, the controller 60 changes the speed ratio to the Lo side and starts the regeneration by the motor generator 30 by the following operation.

Figure 3:
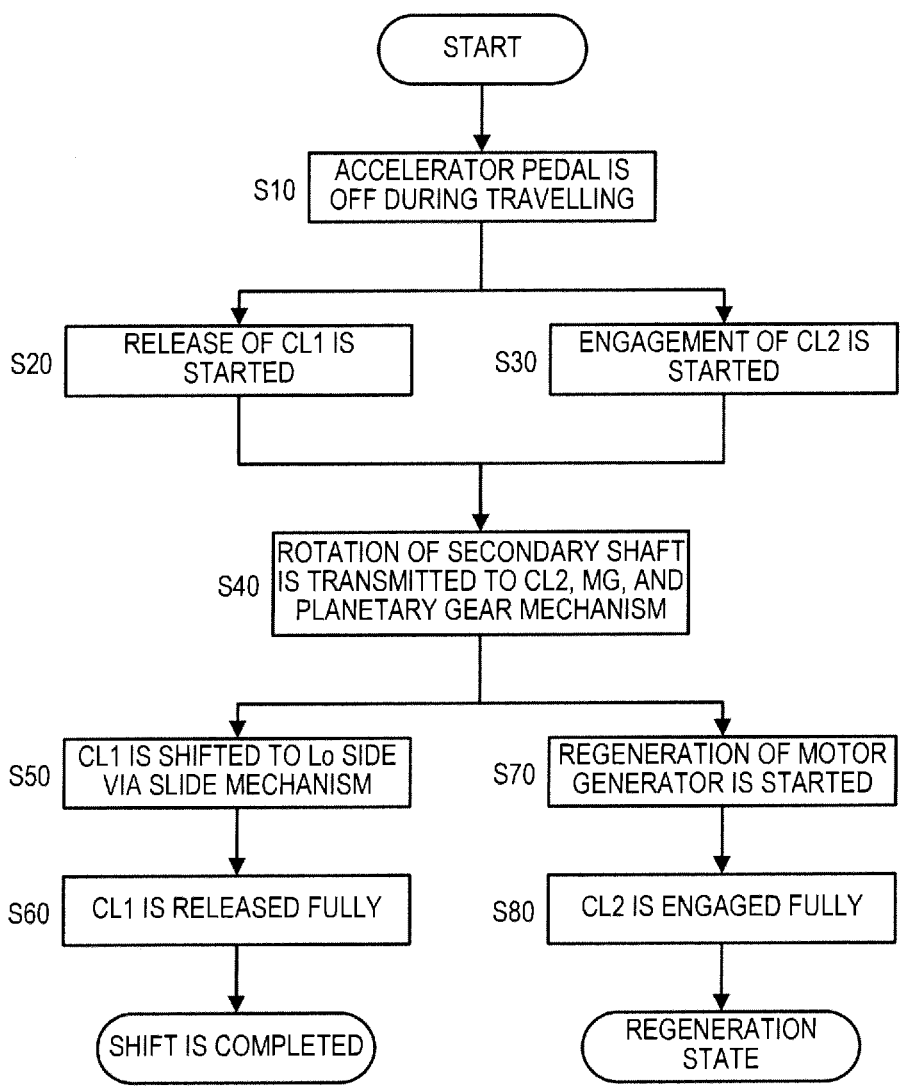
FIG. 3 is a flowchart of control of a mode 6 according to the first embodiment of the present invention.

FIG. 3 is a flowchart of the control of the mode 6 according to this embodiment.

The controller 60 starts the flowchart of FIG. 3 when it is determined that the accelerator is OFF.

First, the controller 60 starts the release of the first clutch 34 and at the same time, starts the engagement of the second clutch 35. The engaging state of the first clutch 34 and the second clutch 35 is respectively controlled by the solenoids. The controller 60 controls a current to be applied to the solenoids, and starts the engagement of the first clutch 34 and the release of the second clutch 35 (steps S20, S30). Thereby, both of the first clutch 34 and the second clutch 35 become the slipping state (half-clutch state), and the rotation is transmitted with a speed difference between the input rotation speed and the output rotation speed.

As the second clutch 35 becomes the slipping state, the rotation of the secondary shaft 12 is transmitted via the second clutch 35 to the rotor 32 of the motor generator 30. In addition, the rotation of the rotor 32 is also transmitted via the first clutch 34 in the slipping state to the sun gear 41 of the planetary gear mechanism 40 (S40).

The rotation transmitted to the sun gear 41 acts in such a manner that the planetary gear mechanism 40 retreats the slide piston 52. Thus, the movable conical plate 22*b* of the secondary pulley 22 can be moved. When the slide piston 52 retreats, the groove width of the V-groove 22*c* of the secondary pulley 22 increases. By appropriately controlling the groove width of the primary pulley 21, in response to the operation of the secondary pulley 22, the speed ratio of the continuously variable transmission 1 can be shifted to the Lo side, without driving the motor generator 30 (S50). As the speed ratio is shifted to the Lo side during deceleration like this, it is possible to prepare for the subsequent acceleration request to be made by the driver.

Further, the rotor 32 of the motor generator 30 rotates via the second clutch 35. The controller 60 causes the motor generator 30 to function as the generator, and starts the regeneration of this rotational energy (S70).

Thereafter, when the first clutch 34 becomes the releasing state fully, the operation of the slide piston 52 stops, and the groove width of the V-groove 22*c* of the secondary pulley 22 is set at the predetermined groove width (S60).

Further, when the second clutch 35 becomes the engaging state fully, the motor generator 30 rotates by the rotation of the secondary shaft 12 (S80). The motor generator 30 regenerates this rotational energy as power.

Figure 4:
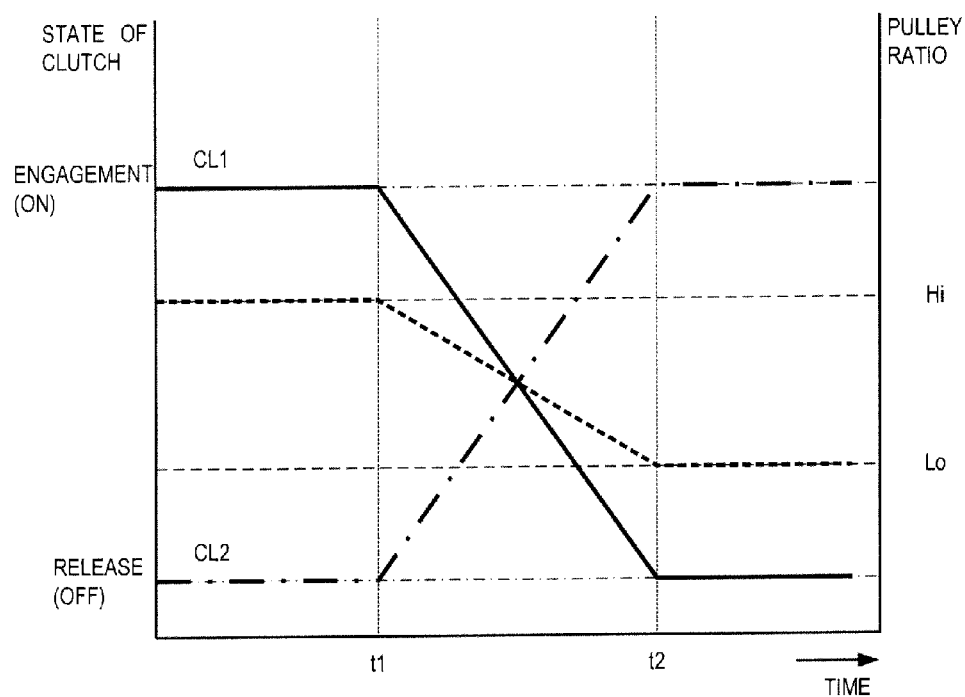
FIG. 4 is a time chart illustrating the control of the mode 6 according to the first embodiment of the present invention.

FIG. 4 is a time chart illustrating the control of the mode 6 according to this embodiment. In FIG. 4, the solid line illustrates the engaging state of the first clutch 34, the alternate long and short dashed line illustrates the engaging state of the second clutch 35, and the dotted line illustrates the speed ratio (pulley ratio), respectively.

In the mode 1 to the mode 4, the first clutch 34 is in the engaging state and the second clutch 35 is in the releasing state. The speed ratio at this time is the predetermined speed ratio on the Hi side.

When the accelerator becomes OFF and a decision on the shift to the mode 6 is made at timing t1, the release of the first clutch 34 is started and the engagement of the second clutch 35 is started. Thereby, both of the first clutch 34 and the second clutch 35 become the slipping state (steps S10 and S20 in FIG. 3).

As engaging capacity of the second clutch 35 gradually increases, the rotation of the secondary shaft 12 rotates the motor generator 30 and the planetary gear mechanism 40 and moves the slide piston 52. By appropriately controlling the hydraulic pressure in the primary pulley 21, the groove widths of the primary pulley 21 and the secondary pulley 22 respond to each other appropriately, and the speed ratio is gradually shifted to the Lo side.

When the first clutch 34 becomes the releasing state fully and the second clutch 35 becomes the engaging state fully, the slide piston 52 is stopped and the speed ratio is fixed at the predetermined speed ratio Lo (timing t2). Under this state, the rotation from the secondary shaft 12 is transmitted via the second clutch to the motor generator 30, and the rotational energy is regenerated as power.

Thus, by the operation of the mode 6, the speed ratio can be shifted from Hi to Lo by using kinetic energy of the vehicle only, without causing the motor generator 30 to consume power for driving. The regeneration by the motor generator 30 can also be made during the shift, and thus the energy efficiency can be improved.

As has been explained thus far, the first embodiment according to the present invention is formed as the continuously variable transmission 1 that is provided with the primary pulley 21, the secondary pulley 22, and the V-belt 23, and that performs shift by changing the groove widths of the primary pulley 21 and the secondary pulley 22.

The secondary pulley 22 is provided with the fixed conical plate 22a that is fixed to the secondary shaft 12, the movable conical plate 22b that moves in the axial direction of the secondary shaft 12 with respect to the fixed conical plate 22a, and the slide mechanism 50 that moves the movable conical plate 22b.

The slide mechanism 50 is provided with the slide piston 52 that causes the movable conical plate 22b to advance/retreat, the motor generator 30 that moves the slide piston 52, the planetary gear mechanism 40 that is interposed between the motor generator 30 and the slide piston 52, the first clutch 34 that makes the rotation between the motor generator 30 and the planetary gear mechanism 40 discontinuous/continuous, the second clutch 35 that makes the rotation between the secondary shaft 12 and the motor generator 30 discontinuous/continuous, and the controller 60 that controls the operation of the motor generator 30.

According to this structure, the movable conical plate 22b can be moved and the groove width of the secondary pulley 22 can be changed, by rotating the motor generator 30 and moving the slide piston in the axial direction of the secondary shaft 12. Thereby, only the primary pulley 21 is subjected to the hydraulic control, and the size and the capacity of the hydraulic pump that generates the hydraulic pressure can be reduced, as a result of which the friction is reduced and the fuel efficiency of the driving source can be improved.

Further, as the secondary pulley 22 does not use the hydraulic pressure for changing the groove width, it does not have a hydraulic chamber, and it is not necessary for the secondary pulley 22 to be provided with a centrifugal hydraulic chamber in order to avoid an influence of centrifugal hydraulic pressure of the hydraulic chamber. As the hydraulic pressure and oil quantity used for changing the speed can be reduced like this, the size and the capacity of the hydraulic pump can be reduced, the friction can be reduced, and the fuel efficiency of the driving source can be improved.

Further, the motor generator 30 is rotated by the rotation of the secondary shaft 12, and the rotational energy can be regenerated as power. The regenerated power is used for driving the motor generator 30. By the structure like this, fuel efficiency of the driving source can be improved.

Furthermore, the slide piston 52 is structured in such a manner that it abuts against the movable conical plate 22b on the side of the outer periphery in the radial direction of the movable conical plate 22b, so as to move the movable conical plate 22b in the axial direction. By the structure like this, it is possible to prevent the power (thrust) applied to the V-belt 23 and a sheave surface of the movable conical plate 22b from making elastic deformation of the movable conical plate 22b in the direction expanding in the axial direction, and to minimize the energy for moving the slide piston 52.

Further, according to this embodiment, the controller 60 causes the first clutch 34 and the second clutch 35 to be in the slipping state during when the vehicle is decelerating, the rotation of the secondary shaft 12 causes the rotor 32 of the motor generator 30 that is being driven to rotate, and the rotation causes the slide piston 52 to move in the axial direction via the planetary gear mechanism 40. Thereby, the movable conical plate 22b can be moved and the speed ratio can be changed by only the energy of the vehicle during deceleration, without driving the motor generator 30, and thus the fuel efficiency of the driving source can be improved.

Next, the continuously variable transmission 1 according to a second embodiment of the present invention will be explained.

The second embodiment is a modified example of the first embodiment, and is provided with a second planetary gear mechanism 80 in order to improve regeneration efficiency at this time when the motor generator 30 is caused to function as the generator.

Figure 5:
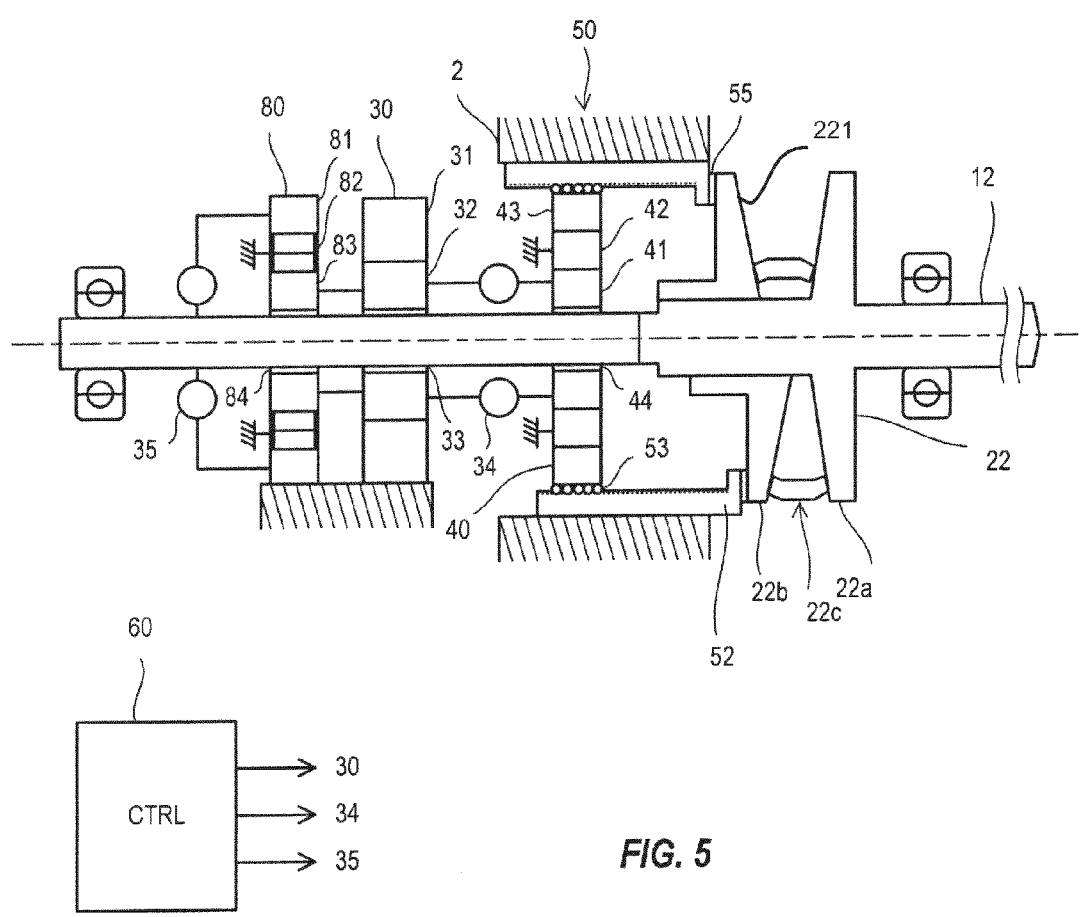
FIG. 5 is an explanatory view of a secondary pulley according to a second embodiment of the present invention.

FIG. 5 is an explanatory view of the secondary pulley 22 according to the second embodiment of the present invention.

The motor generator 30 is rotatably provided on the outer periphery of the secondary shaft 12 via the bearing 33. The stator 31 of the motor generator 30 is fixed to the case 2. The rotor 32 of the motor generator 30 is connected to the sun gear 41 of the planetary gear mechanism 40 via the first clutch 34, and the rotation between the rotor 32 and the sun gear 41 can be made discontinuous/continuous. The rotor 32 is coupled to a sun gear 81 of the second planetary gear mechanism 80, and rotates together with the sun gear 81.

The second planetary gear mechanism 80 is formed by the sun gear 81, double pinions 82, and a ring gear 83. The inner periphery of the sun gear 81 is provided to be able to rotate on the secondary shaft via a bearing 85. A carrier that connects the double pinions 82 is fixed to the case 2. The ring gear 83 is connected to the secondary shaft 12 via the second clutch 35, and the rotation between the ring gear 83 and the secondary shaft 12 can be made discontinuous/continuous.

The operation of thus-structured second embodiment is the same as that of the first embodiment.

In the above-described mode 5, the first clutch 34 and the second clutch 35 are caused to become OFF and ON, respectively, and the rotation of the secondary shaft 12 is transmitted via the second planetary gear mechanism 80 to the motor generator 30.

With the second planetary gear mechanism 80, the rotation inputted to the sun gear 81 is transmitted via the double pinions 82 to the sun gear 81, and to the rotor 32 of the motor generator 30. Thus, the rotation of the secondary shaft 12 is transmitted via the second planetary gear mechanism 80, having the double pinions 82, to the motor generator 30, so that the rotation speed of the motor generator 30 can be increased. This makes it possible to improve the regeneration efficiency by the motor generator 30.

Further, in the mode 7, when the first clutch 34 and the second clutch 35 are caused to become OFF and ON, respectively, and the motor generator 30 is driven to provide an assist to the rotation of the secondary shaft 12, the rotation of the motor generator 30 is transmitted via the second planetary gear mechanism 80 to the secondary shaft.

In this case, the rotation of the motor generator 30 is decelerated by the second planetary gear mechanism 80 having the double pinions 82, and transmitted to the secondary shaft 12, resulting in a reduction in a torque to drive the motor generator 30 and a reduction in power consumption.

The embodiments of the present invention have been explained thus far. However, the above-described embodiments are only a part of application examples of the present invention, and are not intended to limit the technical scope of the present invention to the concrete structures of the above-described embodiments.

According to the above-described embodiments, the structure of providing the slide mechanism 50 in the secondary pulley 22 has been explained. This is because the control can be simplified, as the groove width of the secondary pulley 22 has only to be changed in response to the groove width of the primary pulley 21, in a belt continuously variable transmission 1.

Meanwhile, the slide mechanism 50 may be provided on the primary pulley 21, and the secondary pulley 22 may be driven by the hydraulic pressure. More specifically, the controller 60 decides the target value of the speed ratio based on the vehicle speed, the acceleration/deceleration request, the engine rotation speed and the like, and controls the groove width of the primary pulley 21 in such a manner that the desired pulley ratio can be obtained from the vehicle speed, the input torque to the continuously variable transmission 1, the rotation speed of the primary pulley 21 and the secondary pulley 22 and the like. The groove width of the secondary pulley 22 is controlled in response to the groove width of the primary pulley 21.

Alternatively, the slide mechanism 50 may be provided on each of the primary pulley 21 and the secondary pulley 22, and the groove widths may be changed by the operation of the motor generator 30. By the structure like this, the size and the capacity of the hydraulic pump that generates the hydraulic pressure can be reduced, as a result of which the friction can be reduced, and the fuel efficiency of the driving source can be improved.

According to the above-described embodiments, the vehicle is provided with the engine 10 only as its power source, but it may be provided with the engine 10 and a motor for driving as the power sources, or it may be provided with the motor for driving only.

According to the above-described embodiments, the V-belt 23 may be formed by a plurality of pieces that are coupled by an endless metal belt, or by a rubber belt or a chain.

According to the above-described embodiments, the vehicle is provided with the continuously variable transmission 1 only, but it may be provided with a stepped transmission in series with the continuously variable transmission 1, so as to increase the range of the speed ratio.

According to the embodiments of the present invention, the hydraulic control of the second pulley, whose groove width is changed by the motor generator, can be omitted, and the size and the capacity of the hydraulic pump that generates the hydraulic pressure can be reduced, as a result of which the friction can be reduced. Further, the motor generator may be driven as the generator by the rotation of the rotation shaft, and the rotational energy can be regenerated as power. By the structure like this, it is possible to improve the fuel efficiency of the driving source.

The present application claims a priority of Japanese Patent Application No. 2013-220318 filed with the Japan Patent Office on Oct. 23, 2013, all the contents of which are hereby incorporated by reference.

The invention claimed is:

1. A continuously variable transmission comprising:
    a first pulley and a second pulley capable of changing groove widths; and
    a belt, extended between the first pulley and the second pulley, for transmitting rotation,
    wherein a shift is performed by changing the groove widths of the first pulley and the second pulley,
    wherein the second pulley comprises
        a fixed conical plate fixed to a rotation shaft,
        a movable conical plate moving in an axial direction of the rotation shaft with respect to the fixed conical plate,
        a slide mechanism moving the movable conical plate, and
        a controller controlling a state of the slide mechanism,
    wherein the slide mechanism comprises
        a piston causing the movable conical plate to advance/retreat,
        a motor/generator moving the piston in the axial direction,
        a planetary gear mechanism interposed between the motor/generator and the piston,
        a first clutch configured to switch between an engaged state and a disengaged state, and transmit a rotation of the motor/generator to the planetary gear mechanism in the engaged state, and
        a second clutch configured to switch between an engaged state and a disengaged state, and transmit a rotation of the rotation shaft to the motor/generator in the engaged state, and
    wherein the controller is configured to change the groove width of the second pulley by driving the motor/generator, while the first clutch is engaged, and thus moving the movable conical plate, and drive the motor/generator as a generator by the rotation of the rotation shaft, by engaging the second clutch.

2. The continuously variable transmission according to claim 1,
    wherein the piston abuts against the movable conical plate on an outer periphery side in an axial direction of the movable conical plate.

3. The continuously variable transmission according to claim 1,
    wherein the controller is further configured to cause the first clutch and the second clutch to be in a slipping state, rotates the motor/generator and the planetary gear mechanism by the rotation of the rotation shaft, and moves the piston in the axial direction.

4. The continuously variable transmission according to claim 1,
    wherein a second planetary gear mechanism is provided between the motor/generator and the rotation shaft, and
    wherein, when the second clutch is engaged, the rotation of the rotation shaft is accelerated by the second planetary gear mechanism, and transmitted to the motor/generator.

5. The continuously variable transmission according to claim 1,
wherein the first pulley is provided on a side of a driving power source, and the rotation shaft of the second pulley outputs the shifted rotation.

6. The continuously variable transmission according to claim 1,
wherein the second pulley is provided on a side of a driving power source, and the rotation shaft of the first pulley outputs the shifted rotation.

7. A control method of a continuously variable transmission, including a first pulley and a second pulley capable of changing groove widths, and a belt, extended between the first pulley and the second pulley, for transmitting rotation, the second pulley including a fixed conical plate fixed to a rotation shaft, a movable conical plate moving in an axial direction of the rotation shaft with respect to the fixed conical plate, and a slide mechanism moving the movable conical plate, and the slide mechanism including a piston causing the movable conical plate to advance/retreat, a motor/generator moving the piston in the axial direction, a planetary gear mechanism interposed between the motor/generator and the piston, a first clutch configured to switch between an engaged state and a disengaged state and transmit a rotation of the motor/generator to the planetary gear mechanism in the engaged state, and a second clutch configured to switch between an engaged state and a disengaged state and transmit a rotation of the rotation shaft to the motor/generator in the engaged state, the control method of the continuously variable transmission comprising:
changing the groove width of the second pulley by driving the motor/generator, while the first clutch is engaged, and thus moving the movable conical plate; and
driving the motor/generator as a generator by the rotation of the rotation shaft, by engaging the second clutch.

8. A continuously variable transmission comprising:
a first pulley and a second pulley capable of changing groove widths; and
a belt, extended between the first pulley and the second pulley, for transmitting rotation,
wherein a shift is performed by changing the groove widths of the first pulley and the second pulley,
wherein the second pulley comprises
a fixed conical plate fixed to a rotation shaft,
a movable conical plate moving in an axial direction of the rotation shaft with respect to the fixed conical plate,
slide means for moving the movable conical plate, and
control means for controlling a state of the slide means,
wherein the slide mechanism comprises
a piston causing the movable conical plate to advance/retreat,
a motor/generator moving the piston in the axial direction,
a planetary gear mechanism interposed between the motor/generator and the piston,
a first clutch configured to switch between an engaged state and a disengaged state and transmit a rotation of the motor/generator to the planetary gear mechanism in the engaged state, and
a second clutch configured to switch between an engaged state and a disengaged state and transmit a rotation of the rotation shaft to the motor/generator in the engaged state, and
wherein the control means changes the groove width of the second pulley by driving the motor/generator, while the first clutch is engaged, and thus moving the movable conical plate, and drives the motor/generator as a generator by the rotation of the rotation shaft, by engaging the second clutch.

* * * * *